US010421559B2

(12) United States Patent
Soudbakhsh

(10) Patent No.: US 10,421,559 B2
(45) Date of Patent: Sep. 24, 2019

(54) ROBOTIC HANDLING SYSTEM (RHS)

(71) Applicant: Farzad Soudbakhsh, Milpitas, CA (US)

(72) Inventor: Farzad Soudbakhsh, Milpitas, CA (US)

( * ) Notice: Subject to any disclaimer, the term of this patent is extended or adjusted under 35 U.S.C. 154(b) by 0 days.

(21) Appl. No.: 14/840,033

(22) Filed: Aug. 30, 2015

(65) Prior Publication Data

US 2017/0057664 A1 Mar. 2, 2017

(51) Int. Cl.
| | |
|---|---|
| G06F 7/00 | (2006.01) |
| B64F 1/36 | (2017.01) |
| B64D 9/00 | (2006.01) |

(52) U.S. Cl.
CPC .............. B64F 1/368 (2013.01); B64D 9/00 (2013.01)

(58) Field of Classification Search
None
See application file for complete search history.

(56) References Cited

U.S. PATENT DOCUMENTS

| | | | | |
|---|---|---|---|---|
| 2,826,319 A | * | 3/1958 | Renner | B64F 1/32 104/165 |
| 3,474,925 A | * | 10/1969 | McCartney | B65G 67/00 187/267 |
| 3,522,919 A | | 8/1970 | Bader | |
| 4,635,883 A | | 1/1987 | Hamilton et al. | |
| 5,014,935 A | | 5/1991 | Dalbera | |
| 6,340,136 B1 | | 1/2002 | Luria | |
| 6,663,043 B1 | | 12/2003 | Luria | |
| 6,971,608 B2 | | 12/2005 | Harrington et al. | |

(Continued)

FOREIGN PATENT DOCUMENTS

| | | |
|---|---|---|
| DE | 297 21 959 | 4/1998 |
| DE | 103 38 704 | 3/2005 |

(Continued)

OTHER PUBLICATIONS

UK Search Report for GB 0609891.7, dated Sep. 15, 2006.
UK Search Report for GB 0609891.7, dated Apr. 11, 2007.
Ilyushin IL-86 aircraft, "2.1 Multi-Deck Approach" Sep. 2005.

*Primary Examiner* — Yolanda R Cumbess
(74) *Attorney, Agent, or Firm* — Imperium Patent Works; Amir V. Adibi

(57) ABSTRACT

The baggage/parcels handling system is an automated system that can reduce the use of manpower for baggage/parcels handling and easily adapt to an airport or any baggage/parcels handling organization's process. This system has four different types of structures which can be functioning manually and automatically uploading and downloading luggage (baggage). Transporting and stocking baggage/parcels from one location to the other location are also included in this system. The system has transport vehicle comprises robot, conveyor, laser measurement and an optical reader to recognize the baggage/parcel's size and shape at the time of uploading and downloading. Baggage/parcels transfer cart and stocker system have been installed in the system to transfer or hold a large number of the baggage/parcels and capable of navigating from one location(s) to the other location(s) manually or automatically or pulled by baggage transport vehicle. The system is remotely controlled and monitored through a control room.

20 Claims, 5 Drawing Sheets

(56) References Cited

U.S. PATENT DOCUMENTS

| | | |
|---|---|---|
| 6,994,250 B2 | 2/2006 | Al Amri |
| 7,027,808 B2 | 4/2006 | Wesby |
| 7,744,033 B2 | 6/2010 | Gonzalez Linero |
| 9,087,314 B2 * | 7/2015 | Hoffman ............... G06Q 10/087 |
| 2004/0021572 A1 | 2/2004 | Schoen et al. |
| 2006/0038077 A1 | 2/2006 | Olin et al. |
| 2009/0210092 A1 * | 8/2009 | Park .......................... B25J 5/00 |
| | | 700/259 |
| 2010/0239408 A1 * | 9/2010 | Becker ................. B65G 47/914 |
| | | 414/800 |
| 2013/0110281 A1 * | 5/2013 | Jones ..................... G06Q 10/08 |
| | | 700/228 |
| 2013/0177378 A1 * | 7/2013 | Tuominen .................. B64F 1/32 |
| | | 414/783 |
| 2014/0241837 A1 * | 8/2014 | Bartelet ................... B65G 1/10 |
| | | 414/277 |
| 2014/0377043 A1 * | 12/2014 | Panzram ................ B65G 67/00 |
| | | 414/395 |
| 2016/0288330 A1 * | 10/2016 | Konolige ............... B25J 9/1697 |

FOREIGN PATENT DOCUMENTS

| | | |
|---|---|---|
| GB | 2 403 205 | 12/2004 |
| WO | 98/38087 | 9/1998 |
| WO | 98/54073 | 12/1998 |
| WO | 03/097454 | 11/2003 |

\* cited by examiner

ROBOTIC HANDLING SYSTEM (RHS)

TECHNICAL FIELD

This invention relates to baggage handling systems.

BACKGROUND INFORMATION

There are approximately 87,000 daily flights in the U.S. alone. Tourism statistics indicate that between 2005 and 2014, tourism doubled each year. It is estimated that approximately 26,000,000 parcels are loaded and unloaded along different airport zones each day. Most luggage is heavy for a typical airport employee and weighs at least 20 kg. The quantity of luggage being transported and the burdensome weight of luggage makes the loading and unloading of luggage a challenging endeavor for the airport authority.

Existing baggage handling is mostly done manually at different airports. Luggage is often accidently lost. Airport employees are sometimes injured during luggage handling. Luggage handling tends to slow down as the number of travelers increases. Luggage handling also tends to slow down during poor weather conditions. Due to the manual and laborious nature of baggage handling, many workers are involved in existing luggage handling processes. A solution that overcomes these challenges is desirable.

SUMMARY

A baggage handling system securely and automatically handles airport baggage of variable dimensions. The baggage handling system eliminates or minimizes use of man power for baggage/parcel handling and easily adapts to any baggage/parcel handling organization's process. The baggage handling system comprises a Baggage Transfer Vehicle, a Baggage Transport Cart, a Stocker system, and a Control Room, each of which is operates manually or automatically to transport baggage across an airport system.

The Baggage Transport Vehicle includes a robot, lifter device, a Global Positioning System (GPS) device, network communication devices, a computer, an on board AC and DC power, an optical reader, an image recognition conveyor, a laser measurement and optical reader. The Baggage Transport Vehicle uploads and download baggage/parcel, navigates from one location to the other location(s), and recognizes the baggage/parcel's size and shape using a robotic arm. The Baggage Transport Vehicle is operable by a person, autonomously, or by remote control. The Baggage Transport Vehicle moves on wheels or by rail track. The Baggage Transport Vehicle uses the GPS to determine its location throughout the airport system.

The robotic arm lifts and places baggage onto the Baggage Transport Vehicle. The robotic arm uses a vacuum mechanism, negative pressure, gripper finger mechanism, mini-conveyor mechanism, or another lifting mechanism to lift the luggage. The robotic arm lifts luggage and places the luggage onto the Baggage Transport Vehicle or onto other conveyor systems that transfer luggage. The robotic arm is operable to rotate 360 degree horizontally, elevate up and down vertically and extend or extract on the Baggage Transport Vehicle.

Baggage and parcels are placed at any desired angle on any surface to fit within a desired location or piled above other baggage in a stacked configuration. A computer system runs a program loaded on hard drive that records X, Y, and Z position information of each bag during time of placement of the bag on the surface or above other bags. The computer system calculates a volume of baggage during placement.

A laser measurement and image recognition system is installed at the end of the robotic arm next to the lift mechanism. The laser measurement and image recognition system also recognizes the size and shape of the baggage/parcels, and their position on ground, pallet, counters, conveyor, or a position of baggage/parcels elevation from the ground. The Laser Measurement Device recognizes width, depth, length, angle information of parcels. The Laser Measurement Device recognizes distance information between the Baggage Transport Vehicle and surrounding objects. The Laser Measurement Device recognizes number, size, and location of baggage. The Laser Measurement Device is used to position the robotic arm in placing the baggage/parcel during an upload or download task.

An Image or optical reader is used to scan data on labels disposed on baggage. The optical reader is installed at an end of the robotic arm next to the lift mechanism. The scanned data is compared and matched at the baggage destination to ensure all baggage is securely and safely delivered. The optical reader reads data baggage/parcel labels to manage locality, sort baggage, and prevent of loss of baggage. An image recognition device is used to calculate a top surface of baggage during lifting.

Baggage Transport Cart is used to transfer a large number of the baggage and transporting baggage between locations. The Baggage Transport Cart is operated manually, automatically or pulled by the Baggage Transport Vehicle, or by another vehicle. The Baggage Transport Cart stops an appropriate distance from the Baggage Transport Vehicle such that the robotic arm is able to lift and place baggage onto the Baggage Transport Vehicle. The appropriate distance between the Baggage Transport Cart and the Baggage Transport Vehicle is determined either automatically or in a control room.

The control room remotely controls Baggage Transport Vehicle, Baggage Transport Cart and Baggage Stocker System by transmitting operating commands. The control room also collects data from baggage or parcels and transfers the collected data to destination control rooms for secure baggage handling. The control room control and monitors multiple baggage handling operations simultaneously and at the same time.

A Baggage Stocker System is disposed within a cargo area of an aircraft. The Baggage Stocker System stores and transports baggage across various locations within the cargo area. The Baggage Stocker System comprises a multi-level hydraulic elevator, a horizontal conveyor, a plurality of containers, a vertical conveyor, and a plurality of guide panels. The containers carry one or parcels. The vertical conveyor transports parcels in and out of the Baggage Stocker System using the guide panels to move parcels onto the horizontal conveyors. As each horizontal conveyor fills up with parcels, the guide panel directs parcel containers to a next horizontal conveyor. When all horizontal conveyors in the first level are filled up, the hydraulic elevator rises the first level to fill the second level with parcels in the same fashion.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
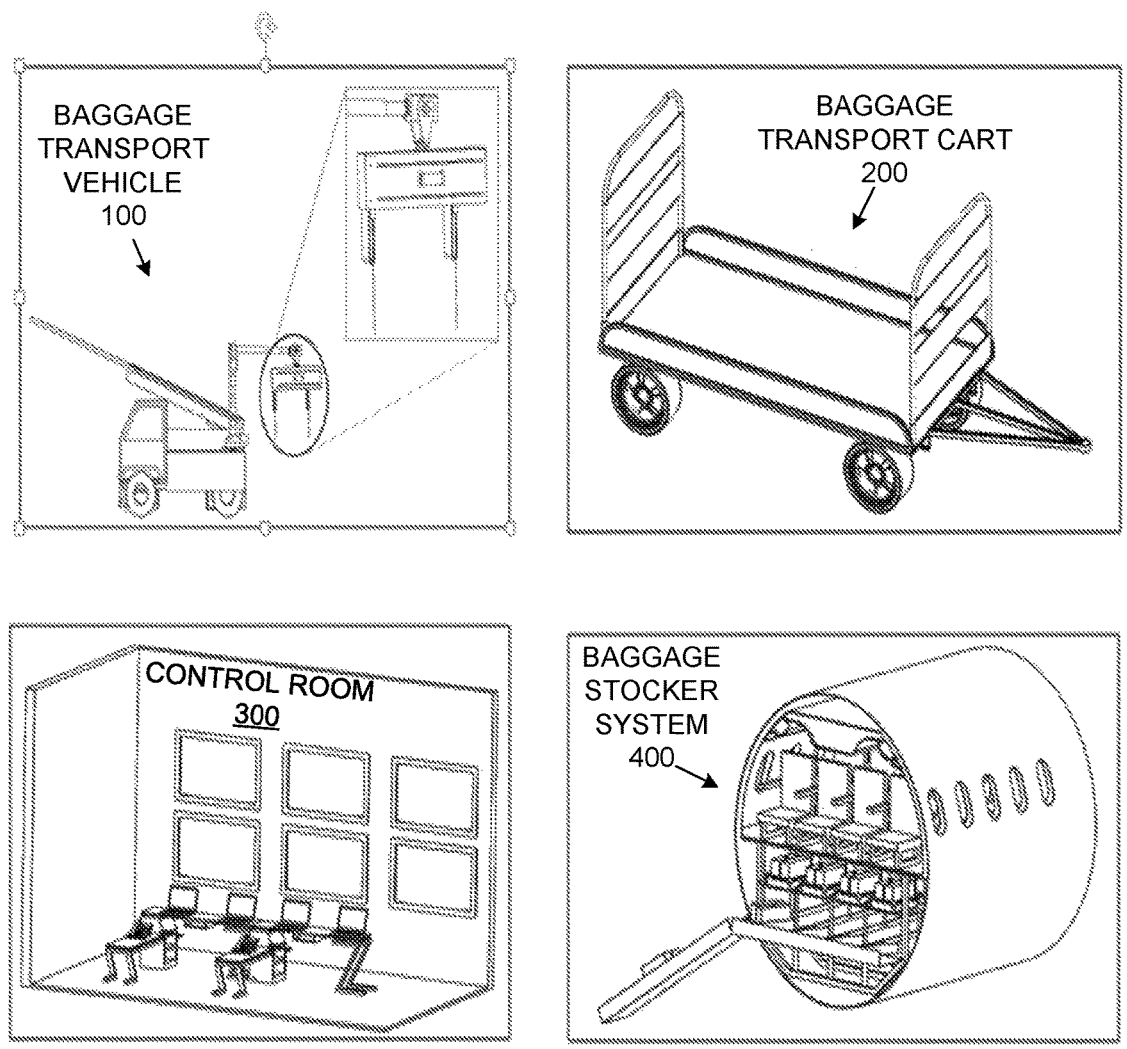
FIG. 1 is a high-level diagram of a baggage handling system.

FIG. 1 is a high-level diagram of a baggage handling system. The baggage handling system comprises a Baggage Transport Vehicle 100, a Baggage/Parcel Transfer Cart 200, a Control Room 300 and a Baggage/Parcel Stocker System 400. A description of each part baggage handling system is provided below.

Figure 2:
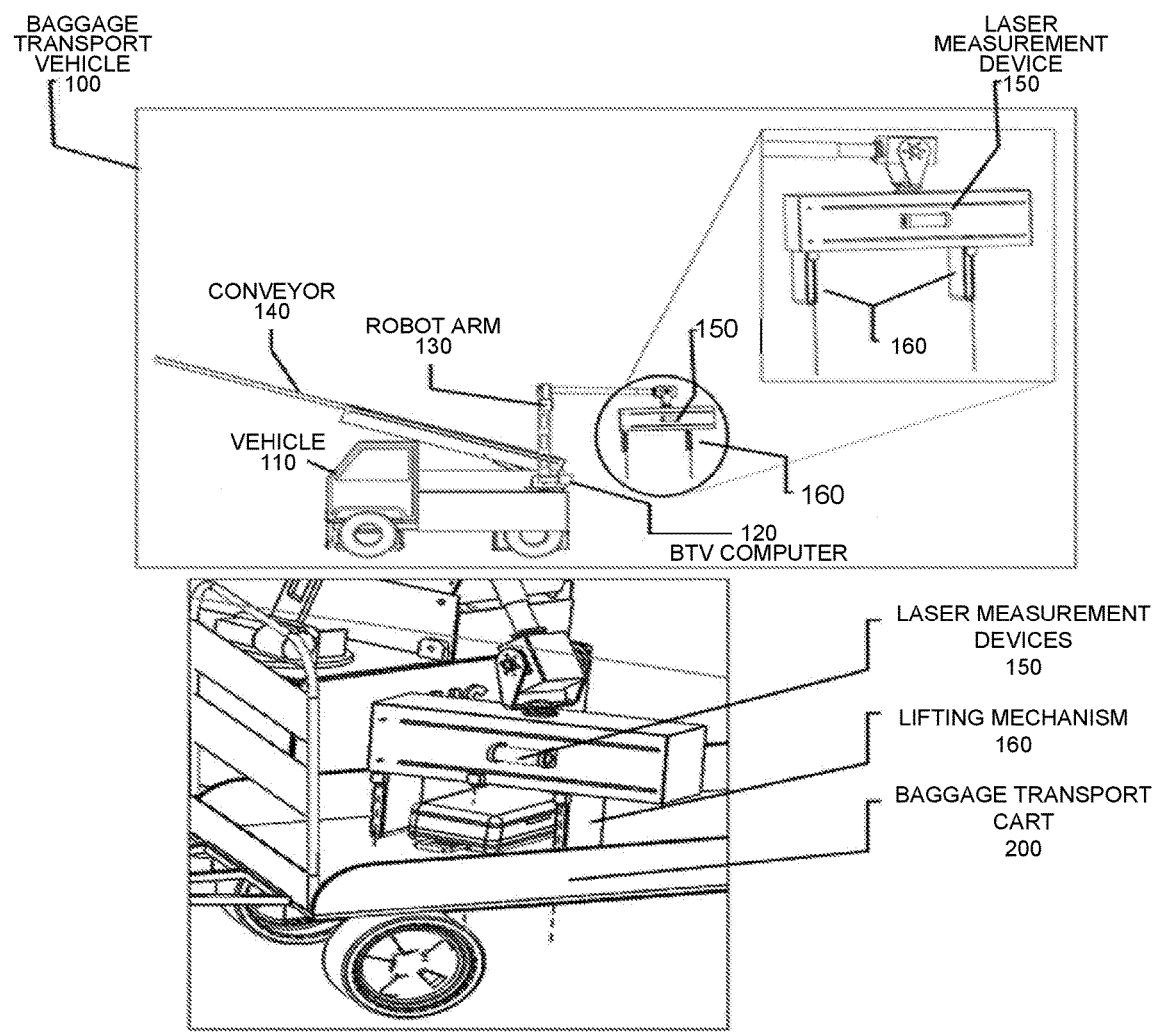
FIG. 2 is a detailed diagram of the Baggage Transport Vehicle 100 shown in FIG. 1.

FIG. 2 is a detailed diagram of the Baggage Transport Vehicle 100 shown in FIG. 1. The Baggage Transport Vehicle 100 comprises a vehicle 110, a computer 120, a robot 130, a conveyor 140, optical readers and laser measurement devices 150, and a lifting mechanism 160. The Baggage Transport Vehicle 100 navigates to locations of baggage/parcels, loads and unloads baggage from one location to another location, and recognizes the size and shape of baggage.

The vehicle 110 travels on road or on a rail track. In one example, the vehicle 110 is navigated by a human in a manual fashion. In another example, the vehicle 110 is fully automated by GPS-based navigation or by color path on ground, road or rail track. The Baggage Transport Vehicle 100 is driven by petroleum, propane gas, solar, battery or hybrid electrical generators.

The computer 120 comprises a Central Processing Unit (CPU), Random Access Memory (RAM), hard drive, motherboard, power supply and input and output ports. The computer 120 is configured to communicate with the Control Room 300 via, wire or wireless devices. The computer 120 can be programmed locally or remotely to carry out a set of baggage/parcels handling operations automatically.

In operation, the computer 120 controls vehicle 110 to navigate to a desired destination, controls hydraulic, AC or DC motor drivers, and controls all sensors around the Baggage Transport Vehicles. Sensors, such as Optical Readers and Laser Measurement Devices 150, Lifting Mechanism 160 and Programmable Logic Control (PLC) are operated through computer 120. The computer 120 also collects data from baggage/parcels labels and transfer the data to Control Room 300.

The computer 120 controls robot 130 manually or automatically. In another example, the robot 130 is controlled manually through by a human operator using shaft and pedal mechanisms to extend or extract the robotic arms to reach the location of baggage/parcels and to lift or place luggage. Automated control of the robot 130 is done through the Control Room 300 via computer 120 that has a preloaded program on the hard drive.

The robot 130 comprises at least one robotic arm. One end of the robotic arm is installed onto a side of the vehicle 110. Optical readers and laser measurement devices 150 and lifting mechanism 160 are attached onto an opposite end of the robotic arm. The robotic arm 130 has a rotation function and extends or extracts to any angle by hydraulic, AC or DC electric motor and controllers.

The optical reader and laser measurement 150-fig2 is a device that is connected to the opposite end of the robotic arm 130. The optical reader 150 is connected to computer 120. The optical reader 150 captures visual information on the baggage/parcels labels and translates the image into digital information to transmit and to store them into a database in Control Room 300 via wire or wireless devices. An example of the data collected by optical readers 150 are name of passenger, flight information, destination and baggage/parcels number in airport.

The laser measurement 150 analyzes the distance between Baggage Transport Vehicle 100 and any object close to the Baggage Transport Vehicle 100. The computer 120 disposed on the Baggage Transport Vehicle 100 controls the GPS navigation system and transmits distance signals for safe travel to the desired destinations. The laser measurement 150 measures the size of baggage/parcels, distance between baggage/parcels, distance of baggage/parcel from the ground, and sends the information to computer 120 for analysis through internal programs.

The lifting mechanism 160 comprises a vacuum system, gripper fingers, or mini-conveyors. The lifting mechanism 160 lifts and places baggage or parcels onto the attached conveyor 140 of Baggage Transport Vehicle 100 or onto an external conveyor system thereby transferring baggage or parcel to different elevations, horizontally or vertically, to be stored or transferred by other carriers. The lifting mechanism 160 is additionally operable to place or lift baggage/parcels from any location to any predefined location. The lifting mechanism 160 is realized as any mechanism suitable for lifting different objects.

Figure 3:
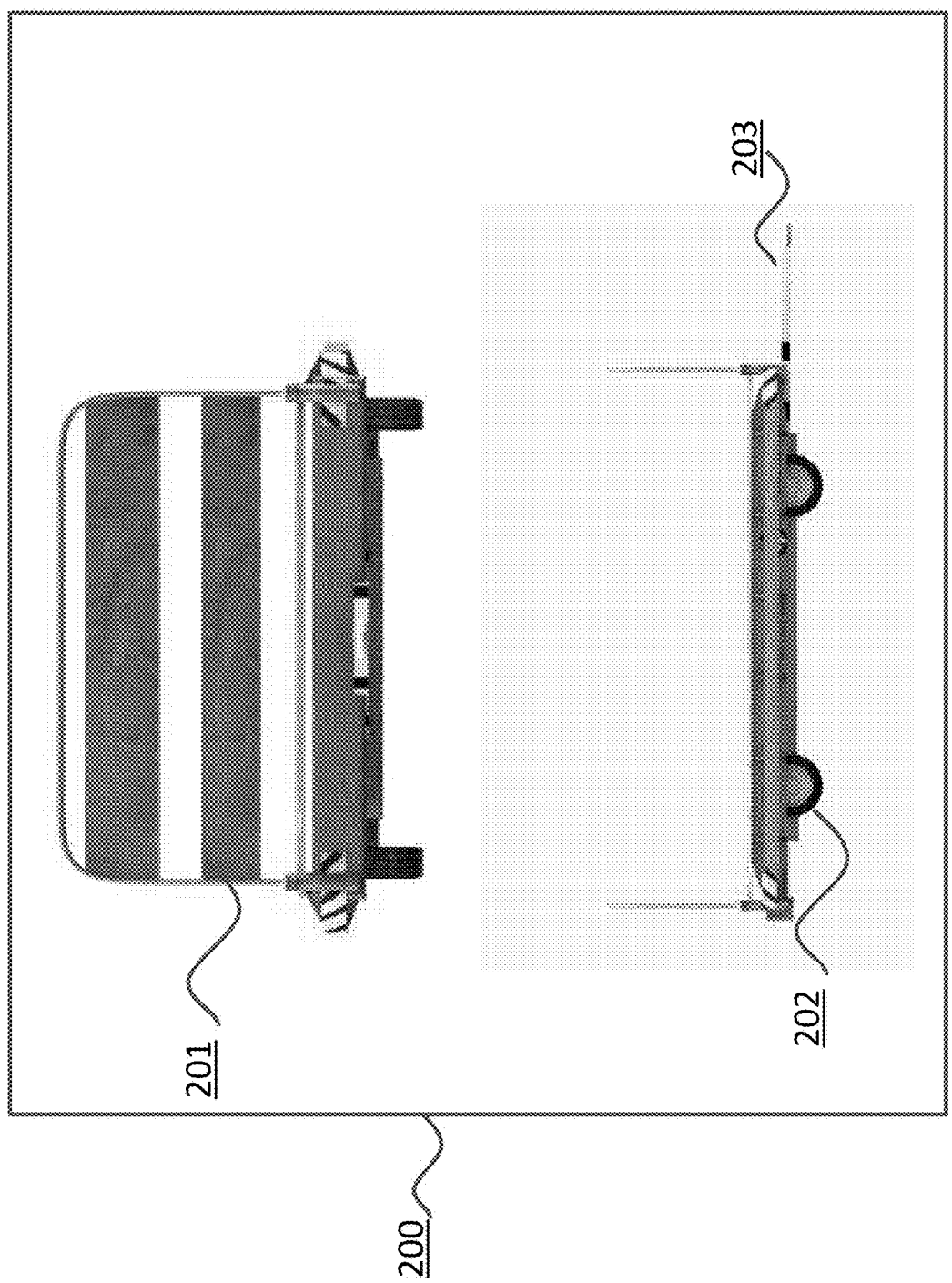
FIG. 3 is a detailed diagram of the Baggage Transfer Cart 200 shown in FIG. 1.

FIG. 3 is a detailed diagram of the Baggage Transport Cart 200 shown in FIG. 1. The Baggage Transport Cart 200 transfers large numbers of baggage and navigates between locations manually pulled by any vehicle or automatically. The Baggage Transport Cart 200 transfers any number of bags or parcels from one location to a predefined location. The Baggage Transport Cart 200 travels on wheels 202 and navigates via road or rail track. In one example, the Baggage Transport Cart 200 is driven manually. For example, a person drives the cart 200 by tow via tow bar 203. In another example, the Baggage Transport Cart 200 is driven by a vehicle. In yet another example, the Baggage Transport Cart 200 is fully automated and is driven with a GPS-based navigation system. In yet another example, the Baggage Transport Cart 200 reaches the desired destination via color path on road. The Baggage Transport Cart 200 is powered by petroleum, propane gas, solar or hybrid, battery or electrical generators (not shown).

Figure 4:
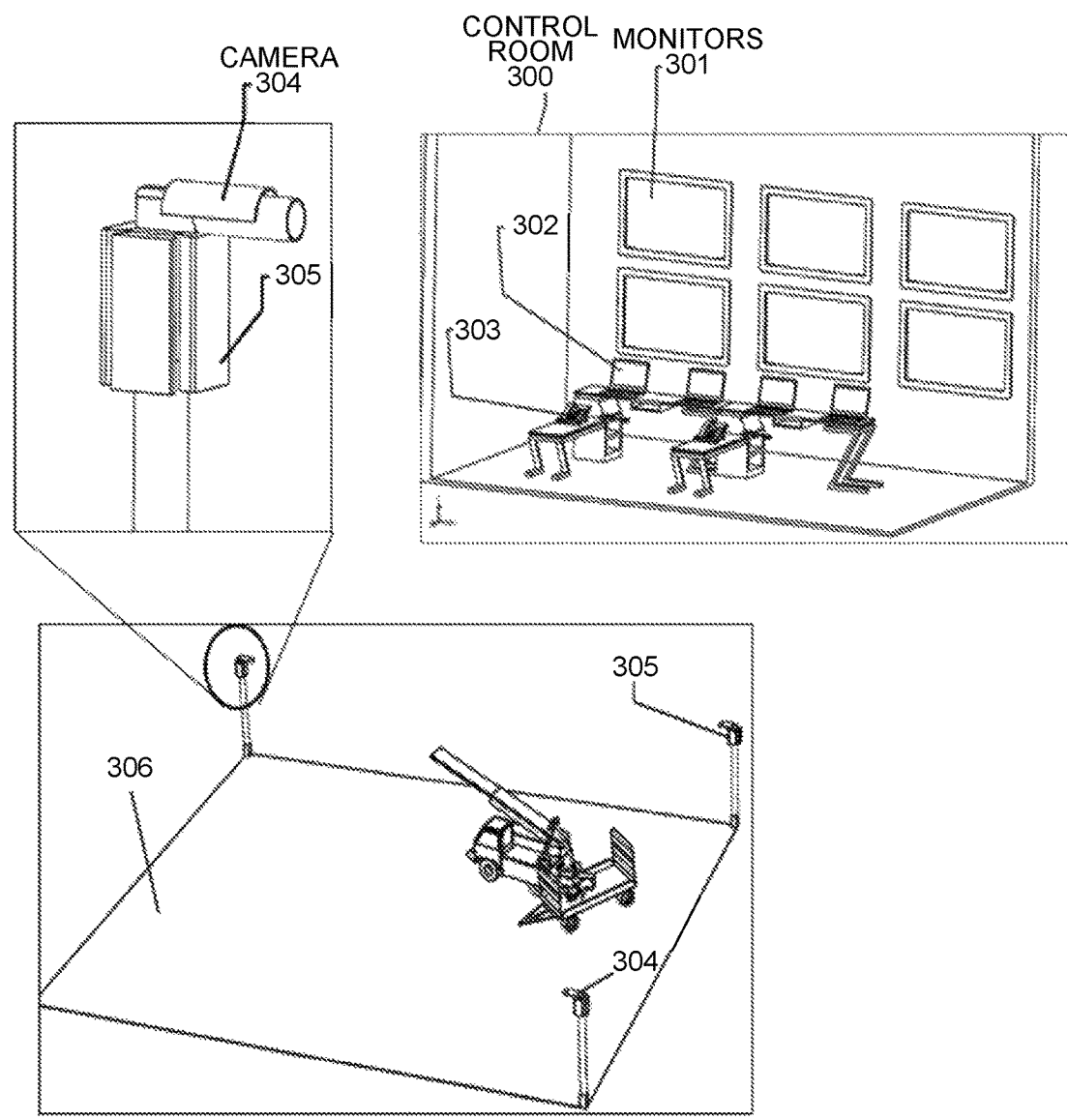
FIG. 4 is a detailed diagram of the control room 300 shown in FIG. 1.

FIG. 4 is a detailed diagram of the control room 300. The control room 300 includes monitors 301, computers 302, telephone 303, cameras 304, and network wire/wireless devices 305. The control room 300 remotely controls the Baggage Transport Vehicle 100 and Baggage Transport Cart 200 and collects baggage labels and transfer data. The control room 300 receives and transmits command and data to Baggage Transport Vehicle 100 and to Baggage Transport Cart 200 via wire or wireless devices 305. Monitors 301 display images captured by the cameras 304 and images transmitted via wireless networks 305 to the control room 300. Computers 302 transmit and receive command, programs and data from Baggage Transport Vehicle's computer 120.

Operators in the control room 300 use all types of voice communication devices including Voice over Internet Protocol (VoIP), telephone 303 to communicate with other operators in the same region or in other locations. Operators in the control room 300 use the Internet Protocol (IP) cameras 304 or drones to steer and navigate the Baggage Transport Vehicle 100 and baggage Transport Cart 200 during baggage handling operations in the region or in other regions.

Figure 5:
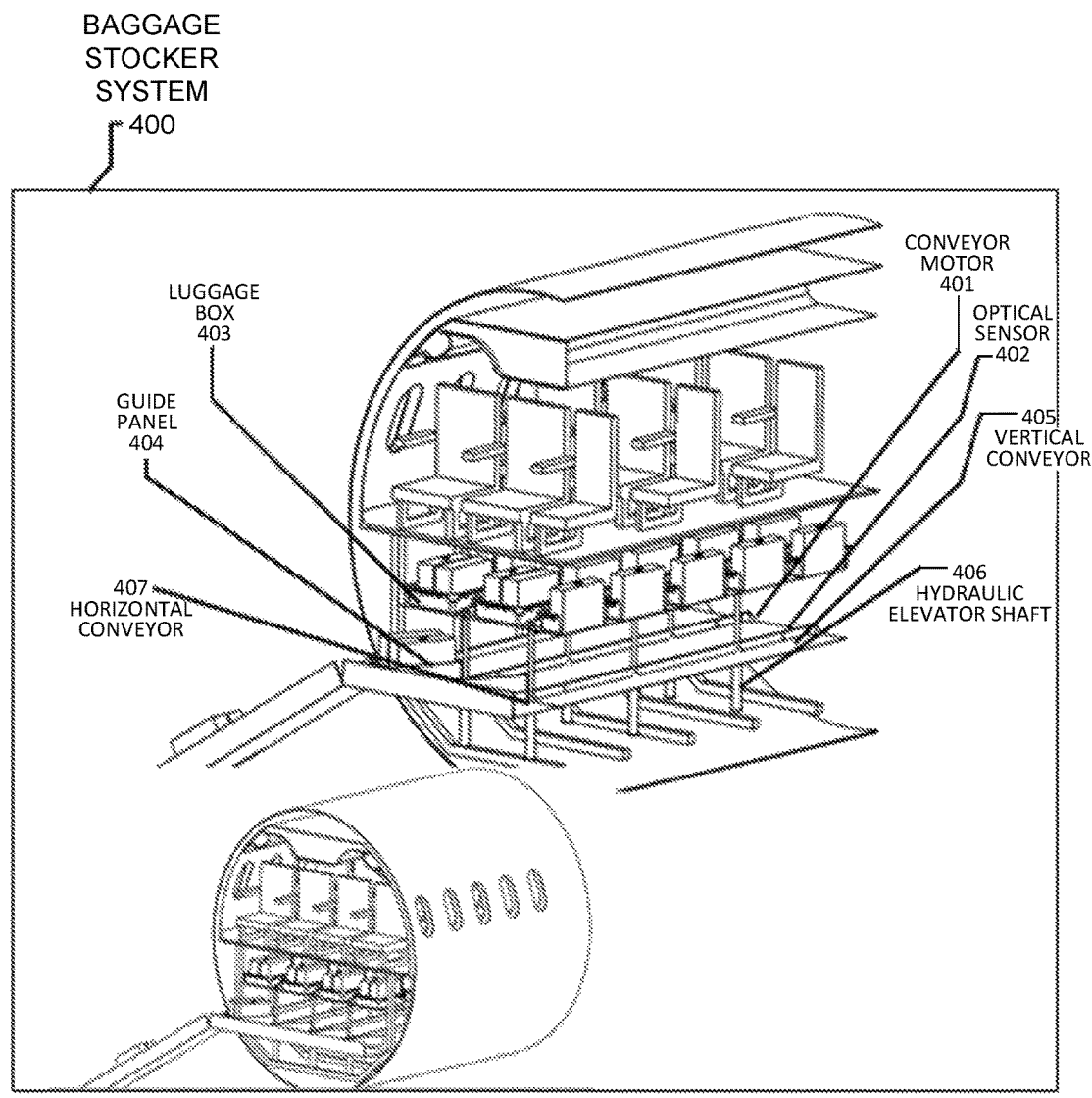
FIG. 5 is a detailed diagram of the Baggage Stocker system 400 shown in FIG. 1.

FIG. 5 is a detailed diagram of the Baggage Stocker System 400 shown in FIG. 1. The Baggage Stocker System 400 is disposed within a cargo section of the aircraft as shown in FIG. 5. The Baggage Stocker System 400 includes conveyor motor 401, optical sensor 402, luggage box 403, guide panel 404, vertical conveyor 405, hydraulic elevator shaft 406 and horizontal conveyor 407. The Baggage Stocker System 400 sorts luggage or parcels and stocks or transfers baggage or parcels between locations with the help of any type of available transportation system or vehicle.

During operation, the conveyor motor 401 pulls and pushes baggage or parcels in and out of the horizontal conveyor 407 and vertical conveyor 405. The horizontal conveyor 407 is used in a shelf-like fashion and has multiple levels. The vertical conveyor 405 carries baggage perpendicular to the horizontal conveyor 407 to pull in and out baggage and parcels from the horizontal conveyor 407. The guide panel 404 is installed along the vertical conveyor 405 and directs the baggage or parcels in and out of horizontal conveyor 407 and to the next horizontal conveyor as each one is filled up with baggage. Luggage box 403 stores luggage placed in the box 403 and is used to optimize space in the baggage stocker system 400. Luggage box 403 is optional and may be omitted based on space management concerns. The optical sensor 402 stops motion of each horizontal conveyor 407 as they are filled up with luggage. In other example, the sensor 402 uses sensors other than optical sensors to detect when the conveyor is full. The hydraulic elevator shaft 406 lifts each level of the horizontal conveyor 407 upwards as horizontal conveyors on the same level are filled up with luggage. Lift mechanisms other than those using hydraulic activation are optionally employed.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

The invention claimed is:

1. A system comprising:
   a Baggage Transport Cart (BTC), wherein the BTC includes wheels and a baggage transport surface;
   a Baggage Stocker System (BSS), wherein the BSS is disposed within a cargo area of an aircraft, wherein the BSS comprises a horizontal conveyor, a vertical conveyor, a hydraulic elevator shaft, and a guide panel; and
   a Baggage Transport Vehicle (BTV) comprising a robotic arm, a conveyor, and a lifting mechanism, wherein the lifting mechanism is disposed along an end of the robotic arm, and wherein the BTV is configured to: (1) place a parcel onto the baggage transport surface of the BTC using the robotic arm and lifting mechanism, (2) lift the parcel from the baggage transport surface of the BTC and place the parcel onto the conveyor of the BTV using the robotic arm and lifting mechanism, and (3) place the parcel onto the horizontal conveyor of the BSS using the conveyor of the BTV.

2. The system of claim 1, wherein the BTV further comprises a laser measurement device, wherein the laser measurement device is disposed along the end of the robotic arm, and wherein the laser measurement device is configured to detect location, size, and shape information of the parcel.

3. The system of claim 1, wherein the BTV further comprises an optical reader, wherein the optical reader is configured to read identifying information on a label disposed on the parcel.

4. The system of claim 1, wherein the robotic arm and lifting mechanism place the parcel into a luggage box before placing the parcel onto the conveyor of the BTV, and wherein the robotic arm and lifting mechanism place the luggage box having the parcel onto the conveyor of the BTV, and wherein the conveyor of the BTV transports the luggage box having the parcel onto the horizontal conveyor of the BSS.

5. The system of claim 1, wherein the horizontal conveyor of the BSS transports the parcel onto the vertical conveyor using the guide panel, and wherein the vertical conveyor transports the parcel within the cargo area of the aircraft.

6. The system of claim 1, wherein the hydraulic elevator shaft of the BSS is configured to adjust an elevation of the vertical conveyor.

7. The system of claim 1, wherein the BSS is disposed below a passenger area of the aircraft.

8. The system of claim 1, wherein the BTC comprises a tow bar, wherein the tow bar of the BTC is attachable to the BTV, and wherein the BTV transports the BTC to the BSS.

9. The system of claim 1, wherein the lifting mechanism of the BTV includes a first conveyor and a second conveyor, wherein the first conveyor and the second conveyor are configured to clamp the parcel, and wherein the first conveyor and the second conveyor are operable to rotate the parcel after the parcel is clamped.

10. The system of claim 1, further comprising:
    a control room having a computer system that stores baggage label and transfer information.

11. The system of claim 10, wherein the computer system within the control room is operable to remotely control the BTV and the BSS.

12. The system of claim 10, wherein the vertical conveyor of the BSS is perpendicular to the horizontal conveyor of the BSS.

13. A system comprising:
    a Baggage Stocker System (BSS), wherein the BSS is disposed within a cargo area of an aircraft, wherein the BSS comprises a horizontal conveyor, a vertical conveyor, a hydraulic elevator shaft, and a guide panel; and
    means for placing a parcel onto a baggage transport surface, wherein the means is also for transporting the parcel from the baggage transport surface onto the horizontal conveyor of the BSS.

14. The system of claim 13, wherein the means is a Baggage Transport Vehicle (BTV) comprising a robotic arm, a conveyor, and a lifting mechanism.

15. A method comprising:
    (a) placing parcels onto a surface of a Baggage Transport Cart (BTC);
    (b) transporting the BTC to a Baggage Stocker System (BSS), wherein the BSS is disposed within a cargo area of an aircraft;

(c) transporting the parcels from the BTC onto a horizontal conveyor of the BSS; and (d) distributing the parcels throughout the BSS by moving parcels from the horizontal conveyor onto vertical conveyors using at least one guide panel, moving the parcels along the vertical conveyors, and by adjusting an elevation of the vertical conveyors such that some of the parcels are disposed on vertical conveyors that are above other parcels disposed on other vertical conveyors.

16. The method of claim 15, wherein the placing of (a) involves using a robotic arm and a lift mechanism to lift the parcels and place the parcels on the surface of the BTC.

17. The method of claim 15, wherein the transporting of (c) involves using a robotic arm and a lift mechanism to lift the parcels off of the surface of the BTC and to place the parcels on a conveyor and using the conveyor to transport the parcels onto the horizontal conveyor of the BSS.

18. The method of claim 15, wherein elevation of the vertical conveyors of the BSS is adjusted in (d) via a hydraulic lift that is part of the BSS.

19. The method of claim 15, wherein a laser measurement device issued to detect location, size, and shape information of the parcels before placing the parcels onto the surface of the BTC in (a).

20. The method of claim 15, wherein the transporting in (b) involves attaching the BTC to a Battery Transport Vehicle (BTV).

\* \* \* \* \*